June 3, 1952    S. C. W. WILKINSON    2,599,034
SEALING MEANS BETWEEN ROTATING AND
NONROTATING MACHINE PARTS Filed Oct. 5, 1948      2 SHEETS—SHEET 1

Inventor
S. C. W. Wilkinson
By
C. F. Kendearth
Attorney

Patented June 3, 1952

2,599,034

UNITED STATES PATENT OFFICE 2,599,034

SEALING MEANS BETWEEN ROTATING AND NONROTATING MACHINE PARTS

Samuel Clifford Walter Wilkinson, Burnham, England, assignor to Crane Packing Limited, Slough, England Application October 5, 1948, Serial No. 52,818
In Great Britain October 9, 1947

6 Claims. (Cl. 286—11)

This invention relates to sealing means between rotating and non-rotating machine parts, such as the parts adjacent the shaft bearings of liquid pressure pumps and compressors. In particular the invention relates to sealing means surrounding the rotary shafts of compressor and pressure pump chambers from which liquid under pressure tends to escape at the shaft bearings. The type of sealing means with which the present invention is concerned comprises a sealing member moving with the rotary shaft, and a stationary sealing member located in the chamber wall or casing, the two sealing members having opposed faces in contacting pressure with respect to one another. There is naturally considerable wear between such faces and therefore they need to have long life or to be easily renewable.

The chief object of the present invention is to provide improvements in sealing means of the type referred to and in particular to provide for long life and/or ready accessibility and quick renewal of the sealing members.

According to the present invention the sealing means comprise a smooth hard-wearing sealing member (e. g. metal) rotating with the rotary member or shaft, a smooth relatively soft-wearing stationary sealing member (e. g. carbon) and means whereby as the latter member becomes worn away, the co-operative rotary member, which is free to move sufficiently to keep in pressure contact with the stationary member, is automatically advanced axially to the requisite extent.

In addition to the constantly available movement of the rotary sealing member towards the stationary sealing member, as the latter becomes worn away, the said normally stationary member is preferably made adjustable at will from time to time towards the rotary sealing member.

The rotary sealing member is made adjustable or "floating" along the rotary shaft or equivalent member that carries it, by mounting the said rotary sealing member directly or indirectly on the outer rim of a flexible ring or substantially U-shape in cross section, embracing the said shaft, so that as wear takes place the rotary sealing member is able to creep towards the stationary sealing member by a slight axial movement of the said outer rim of the U-section ring permitted by a corresponding slight change at the bend of the flexible ring.

In order that the invention may be clearly understood and readily carried into effect, I will now describe the same more fully with reference to the accompanying drawings, in which.

Figure 1:
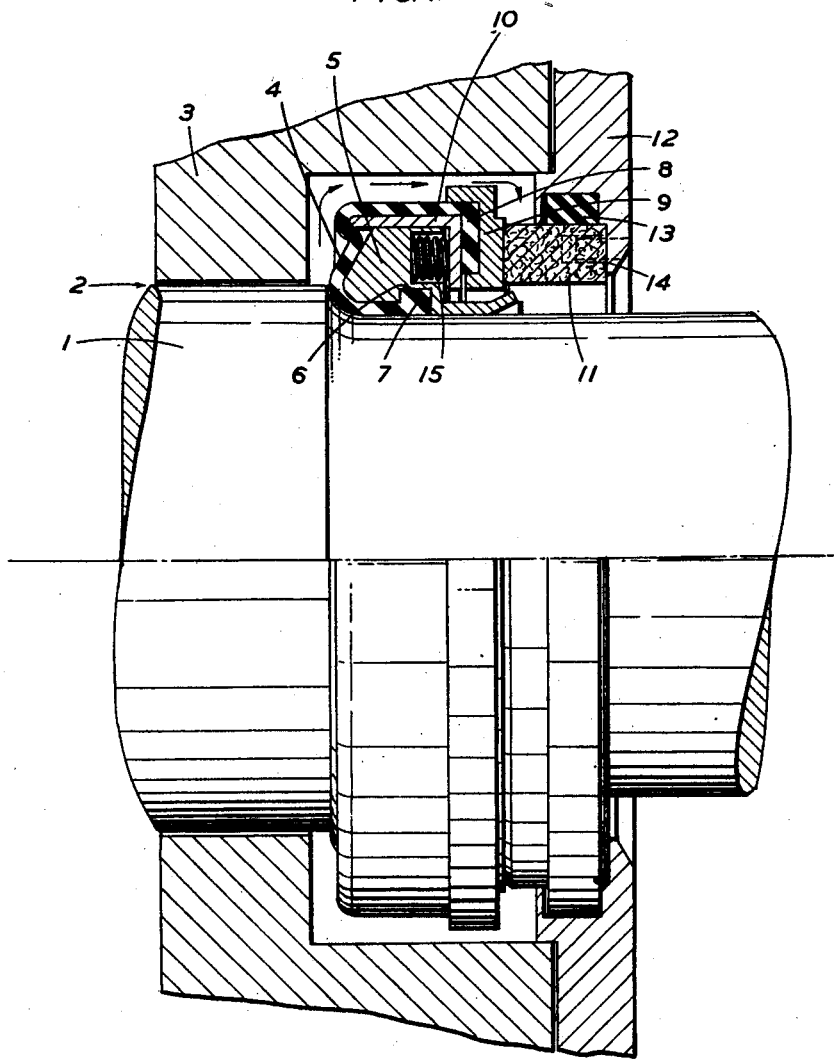
Figure 1 represents one embodiment of the present invention partly in section and partly in elevation on a portion of a rotary shaft shown in elevation.

In the drawings the reference numeral 1 indicates a rotary shaft operative in a liquid pressure chamber 2 and supported in a stationary wall 3 of said chamber. 4 is a ring embracing the shaft 1 and rotating therewith, said ring being formed of flexible material, such as rubber or synthetic resin, and of substantially U-shape in cross section, its cavity at the bend being occupied by a supporting and filling ring 5 which is undercut at 6 to inter-lock with a rib 7 on the inner limb of the U-shaped ring 4. The rim of the outer limb of the ring 4 is flanged as at 8 to carry the hard-wearing sealing member 9 of the sealing means. Actually, as shown, a metal intermediary ring or sleeve 10 may be used between the said outer limb and the filling ring 5. This ring or sleeve prevents the flexible ring 4, which is exposed on its outer surface to the liquid pressure, from becoming unduly distorted or collapsed by reason of such pressure.

The stationary soft-wearing (carbon) sealing member of the sealing means is indicated by the reference numeral 11. It is positioned in a recess on the inner face of a backing plate 12 attached to the wall 3 of the pressure liquid chamber 2. 13 is a rubber packing ring used in the plate 12 at the rear of the carbon sealing ring. 14 indicates a peg which may be passed through a hole in the plate 12 into a recess in the sealing ring to prevent it from being dragged around in company with the rotary sealing ring 9. The direction in which the liquid tends to escape past the shaft bearing as far as the sealing means is indicated by arrows on the drawing.

From the foregoing description it will be understood that the sealing ring 11 is easily accessible for renewal when badly worn, and that as it wears away the rotary sealing ring 9 is free to flow up the retreating surface of the ring 11 by reason of said ring 9 being carried floatingly on the rim of the outer wall of the flexible U-shaped member 4. The slight distortion or flexing of the member 4 at its bend to enable the ring 9 to advance as the ring 11 wears away occurs partly by reason of the liquid pressure acting on the said member from left to right and partly by a group of metal springs of which one is seen at 15 housed in a recess in the filling ring 5 and bearing against the sleeve 10. It may be mentioned that the substantially U-shaped member 4 is moulded with a substantially normal bend but under the pressure of the liquid it becomes distorted somewhat as shown in the drawing.

Figure 2:
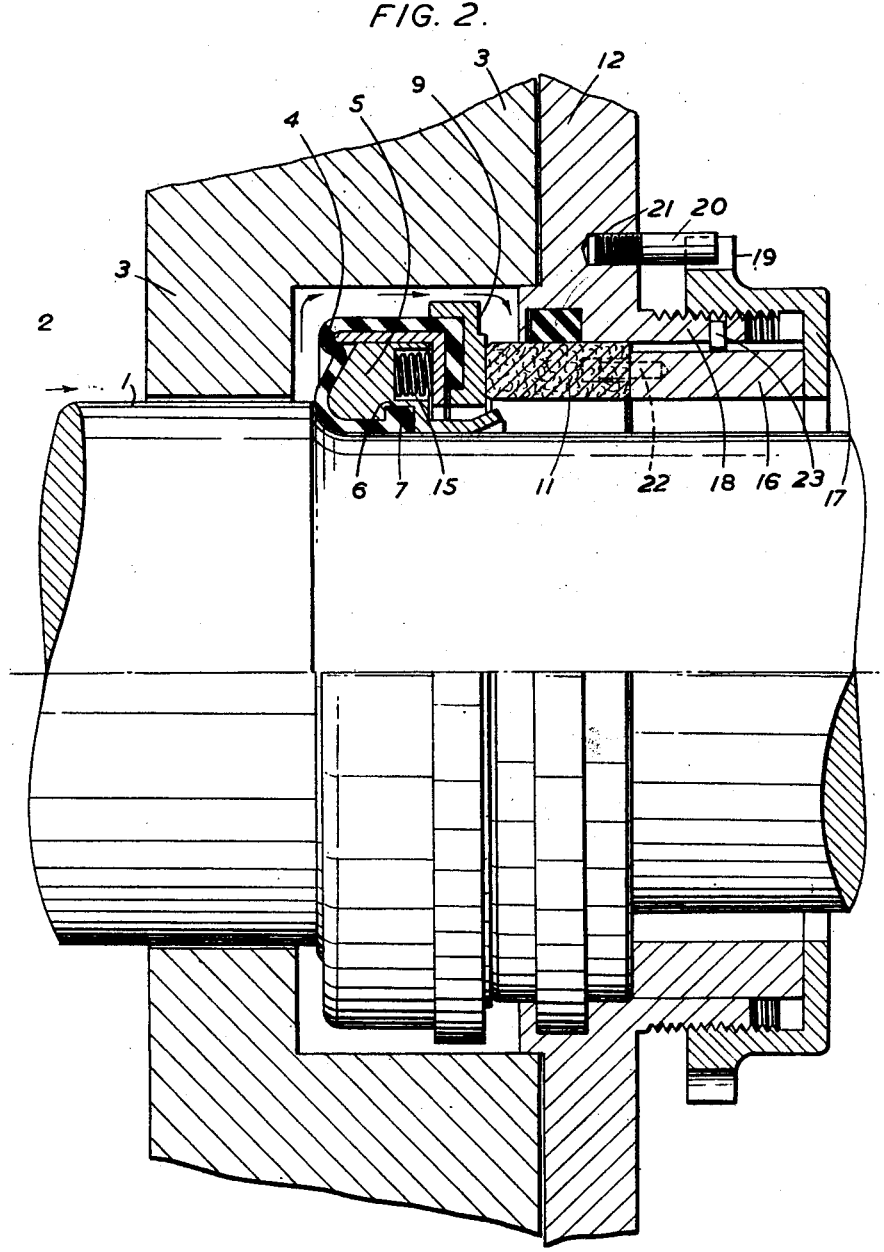
Figure 2 illustrates a modification of the sealing means shown in Figure 1, the difference being that the stationary sealing member is axially adjustable at will in the construction of Figure 2.

Sealing means such as hereinbefore described with reference to Figure 1 are quite satisfactory on say a pump subject to a routine overhaul every six months. In the case, however, of say a refrigerator compressor expected to run for five or ten years, occasional adjustability of the stationary sealing ring in some simple way (say every six months) is desirable. One means of such adjustment is shown in Figure 2 where the stationary sealing ring 11 is shown in conjunction with a backing ring 16 and an adjustable hood 17. This hood 17 is shown in screw-threaded engagement with a flange 18 on the cover plate 12 of the wall 3 of the chamber, and is provided with teeth 19 between any pair of which a locking pin 20 may be located for screw engagement with a recess 21 in the cover plate 12. By this arrangement it will be understood that as the sealing ring 11 wears away, it may be advanced from time to time by removing the locking pin 20 and turning the hood 17 until the backing ring 16 has forced the ring 11 forwardly to the desired extent, whereupon the pin 20 is replaced. The sealing ring 11 may be locked against rotation with the rotary sealing ring 9 by a peg 22 anchoring it to the backing ring 16, and the latter may be anchored against rotation by a stud 23 securing it to the flange 18.

I claim:

1. Liquid sealing means as between a rotary member and a stationary member, such as the shaft of a pump or compressor and a wall thereof, said sealing means comprising a stationary sealing ring, a substantially U-shaped flexible ring embracing said shaft to rotate therewith and having its convex surface at the bend thereof exposed to the liquid, a sealing ring riding upon the rim of the outer wall of said flexible ring and opposed face to face to said stationary ring, a ring located partly in the annular cavity inside said flexible ring and embracing the inner annular wall thereof and located partly beyond said cavity and wall and directly embracing the shaft so as to rotate therewith, spring means also located inside the said annular cavity and bearing longitudinally in one direction toward said riding ring to urge it against said stationary ring and bearing in the opposite direction longitudinally against an abutment forming part of the aforesaid ring that is located partly in said annular cavity, and a rigid supporting ring shaped and located inside the cavity of the U-shaped flexible ring to prevent the outer annular wall of the latter from collapsing by the external pressure of the liquid upon it.

2. Liquid sealing means according to claim 1, in which the spring means consists of a circular assembly of helical springs.

3. Liquid sealing means according to claim 1, including an undercut groove formation on the ring that embraces the inner annular wall of the U-shaped flexible ring and a counterpart groove-filling rib on said annular wall.

4. Liquid sealing means according to claim 1, including means for axially adjusting the position of the stationary sealing ring.

5. Liquid sealing means according to claim 1, including a backing ring bearing against the stationary sealing ring, an axially adjustable annular hood enveloping the backing ring, and means for locking said hood after adjustment.

6. Liquid sealing means according to claim 1, including a flange on the rim of the outer wall of the U-shaped flexible ring, the said sealing ring that rides on said rim fitting over the flange thereof.

SAMUEL CLIFFORD
WALTER WILKINSON.

REFERENCES CITED

The following references are of record in the file of this patent:

UNITED STATES PATENTS

| Number | Name | Date |
|---|---|---|
| 811,833 | Emmet | Feb. 6, 1906 |
| 880,846 | Dake | Oct. 4, 1932 |
| 2,209,085 | Jensen | July 23, 1940 |
| 2,247,505 | Kohler | July 1, 1941 |
| 2,322,834 | Dornhofer | June 29, 1943 |
| 2,358,830 | Schick | Sept. 26, 1944 |
| 2,467,643 | Voytech | Apr. 19, 1949 |

FOREIGN PATENTS

| Number | Country | Date |
|---|---|---|
| 549,337 | Great Britain | of 1942 |